No. 758,150. PATENTED APR. 26, 1904.
G. A. W. SCHILLING.
STRAINER AND FILTER.
APPLICATION FILED DEC. 30, 1903.
NO MODEL. 2 SHEETS—SHEET 2.
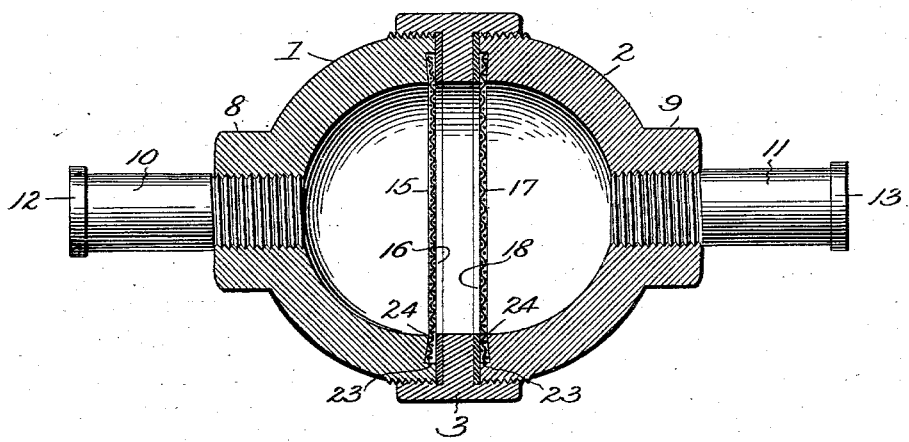
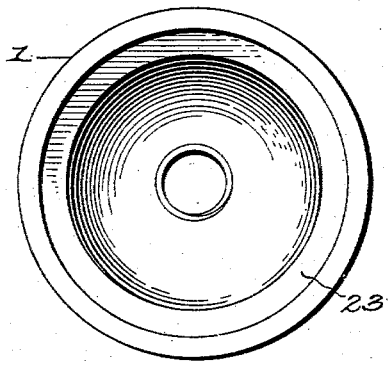
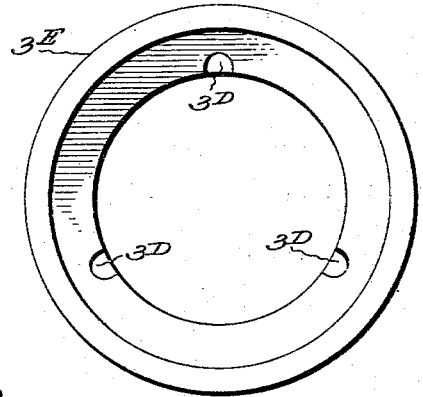
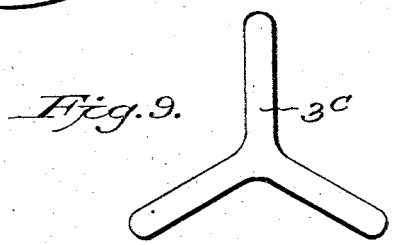
Witnesses
Inventor
Gustave A. W. Schilling.
By
H. S. Bailey
Attorney No. 758,150. Patented April 26, 1904.

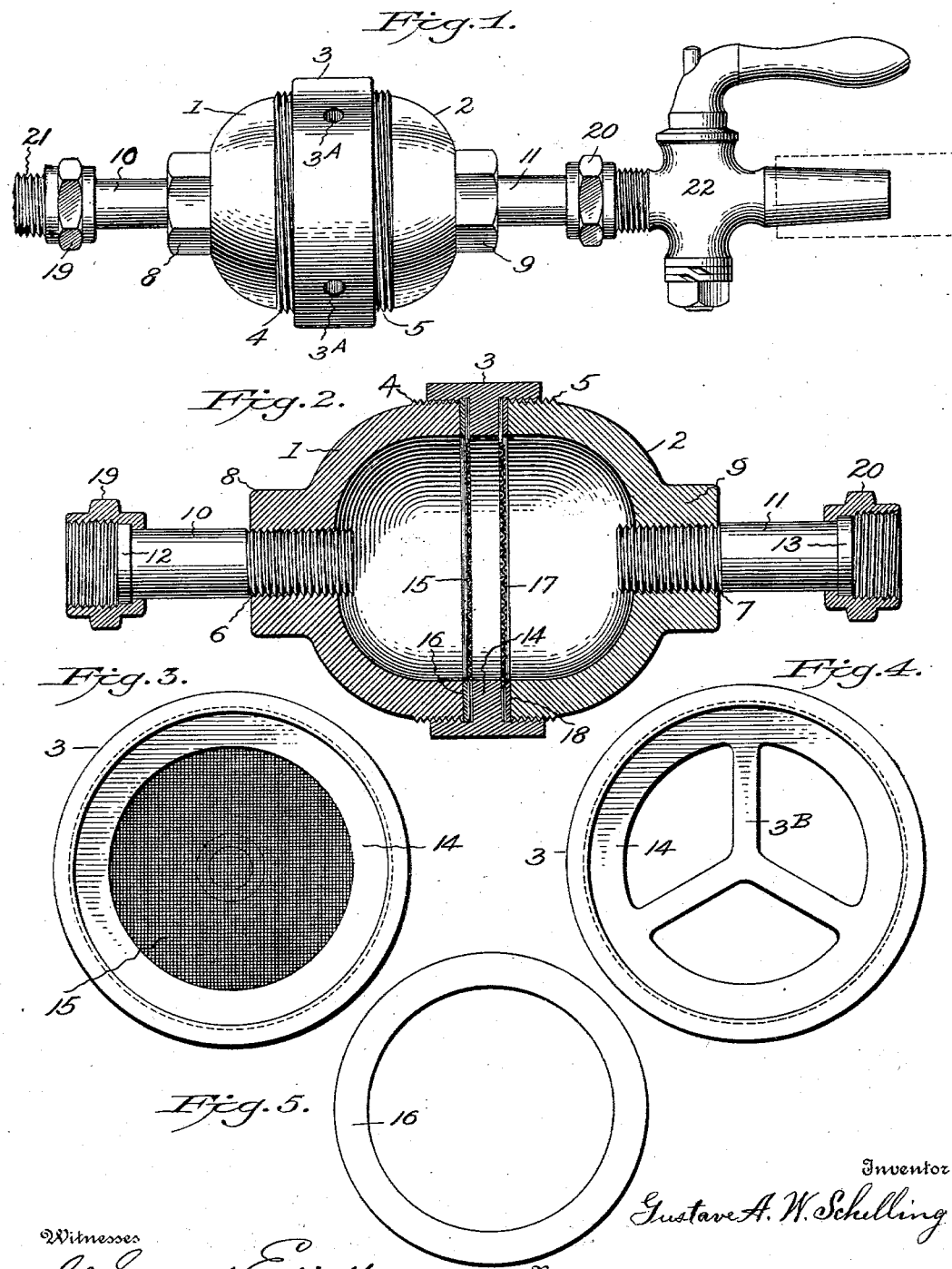

UNITED STATES PATENT OFFICE.

GUSTAVE A. W. SCHILLING, OF DENVER, COLORADO, ASSIGNOR TO JOHN P. PAULSON AND ANDREW P. THOMPSON, OF DENVER, COLORADO.

STRAINER AND FILTER.

SPECIFICATION forming part of Letters Patent No. 758,150, dated April 26, 1904.

Application filed December 30, 1903. Serial No. 187,174. (No model.)

*To all whom it may concern:*

Be it known that I, GUSTAVE A. W. SCHILLING, a citizen of the United States of America, residing in the city and county of Denver and State of Colorado, have invented certain new and useful Improvements in Strainers and Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in strainers and filters for various uses, and particularly to that class of strainers which are used to prevent sand and other debris from entering the valves of hydraulic beer-pumps.

The invention consists in providing a suitable straining device which is attached to the water-inlet pipe in such a manner as to prevent any foreign substances which may be in the water from entering the valves of the pumps and cutting out the said valves, thus rendering them useless and entailing a considerable amount of time and expense in repairing the same, the strainer being so constructed that it may be quickly taken apart when it is desired to remove the foreign matter collected therein or replace the old screens with new ones. I accomplish these ends by the mechanism illustrated in the accompanying drawings, in which—

Figure 1 is a side elevation of the strainer, a spigot being attached to the water-inlet pipe, by which the supply of water may be cut off when desired, while upon the outlet side of the strainer is shown a fragment of the pipe leading to the pump. Fig. 2 is a longitudinal sectional view through the strainer. Fig. 3 is an elevation looking into the strainer, one of the sections thereof, with its screen, being removed. Fig. 4 is a view of a modified form of the band into which the two sections of the strainer screw. Fig. 5 is a view of one of the leather washers against which the sections of the strainer are screwed. Fig. 6 is a sectional view of a slightly-modified form of the strainer, the sections comprising the strainer having counterbores formed in their rims, in which the screens lie. Fig. 7 is a front elevation of one of the strainer-sections, clearly showing the counterbore. Figs. 8 and 9 are views illustrating a further modification of the band which unites the two sections, in which a removable spider is employed.

Referring to the accompanying drawings, the numeral 1 indicates one section of the strainer, 2 the other section thereof, which is a counterpart of section 1, and 3 an internally-threaded band into which the sections of the strainer are screwed. Each section comprises a hollow semispherical metal member the rim of which is externally threaded, the threads 4 and 5, respectively, being right-handed. A threaded hole 6 is formed axially through the wall of section 1, and a corresponding hole 7 is also formed in the wall of section 2, and when the sections are in position within the band 3 the holes 6 and 7 are in alinement. The metal surrounding these holes is formed into wrench-receiving portions 8 and 9, which may be either square or hexagonal in shape, and into the holes are screwed nipples 10 and 11, respectively, having annular shoulders 12 and 13 on their outer ends. The band 3 is formed internally with an annular abutment or shoulder 14, on each side of which the band is internally threaded. A wire screen 15, of very fine mesh, is placed against one side of the shoulder 14, and a leather ring-washer 16 is then laid upon the screen, after which one of the semispherical sections is screwed into the band against the washer. A screen 17, of coarser mesh, is next placed against the opposite side of the shoulder 14, a leather ring-washer 18 is placed against the screen, and the remaining semispherical section is then screwed into the opposite side of the band, after which the strainer is ready to be connected with the water-supply pipe and with the pump. In order that the strainer may be quickly and conveniently connected, the nipples 10 and 11 are provided with ordinary unions 19 and 20, respectively, and the union 19 connects with the threaded end of a pipe 21, which connects with a hydraulic pump, (not shown,) while the union 20 connects with the threaded end of a suitable faucet 22, the opposite end of which is connected in any suitable manner with a water-supply pipe. (Also not shown.)

In connecting the strainer it is positioned so that the coarse screen will be next to the water-inlet pipe, and as the water passes through the strainer the coarser particles of sand and grit will be caught by the coarse screen, while the finer particles will pass through said coarse screen and will be caught by the second screen, which is of much finer mesh, and as the water passes through the latter screen it will be practically freed from all foreign substances which would injure the valves of the pump.

When it is desired to cleanse the interior of the strainer or to replace the old screens with new ones, it is only necessary to hold the band 3 by means of an ordinary spanner-wrench, the periphery of the said band being provided with the usual holes 3$^A$ for this purpose, when the unions 19 and 20 may be unscrewed and the strainer removed, the water having first been cut off by the faucet 22. The sections of the strainer may then be unscrewed from the band and the necessary cleansing or replacing of screens effected, after which the strainer is again coupled to the water-supply pipe in the manner described.

In instances where the water-pressure is very strong it may be found necessary to brace or reinforce the coarse screen which receives the full force of the water, and I accomplish this either by the construction shown in Fig. 4, where reinforcing spider-arms 3$^B$, integral with the annular abutment 14 of the band 3, are employed, against which the body of the screen will lie, or, as shown in Figs. 8 and 9, where removable arms 3$^C$ are employed, their ends fitting into recesses 3$^D$, formed in the abutment 14, the arms in both cases branching from a common center, as shown. By the latter constructions a band 3$^E$, as illustrated in Fig. 8, could be used either with or without the brace-arms 3$^C$, according to the water-pressure.

In Figs. 6 and 7 I have illustrated a slightly-different manner of securing the screens from that shown in Fig. 2. In this arrangement the edge or rim of each section 1 and 2 is formed with an annular depression or counterbore 23, in which the screens lie, as shown in Fig. 6, and these depressions are slightly deeper at their outer circumference than at their inner circumference, the depth at the inner circumference being practically the same as the thickness of the screens. Now in assembling this form of strainer the leather washers or gaskets are first placed in the band 3, one on each side of the annular abutment 14. The screens are then placed in the circular depressions 23 of the sections 1 and 2 and the sections are screwed into the band against the leather washer, and as the screens are in the circular depressions and the portions of the rims of the sections beyond the depressions contract with the washers and clamp them against the annular abutment of the band. a water-tight connection is formed between the sections and the band, and leakage is thus prevented. The edges formed by the inner circumference of the counterbores or circular depressions 23 will bind upon the screens, as shown at 24, and clamp them against the washers, thus securely holding them, while the increasing depth of the depressions toward their outer circumferences will prevent any portion of the surface of the screens being clamped against the washers except the portion clamped by the edge formed by the inner circumferences of the depression, as before stated, thus securing an even and uniform impingement of the sections upon the screens and upon the washers. The device herein described is adapted also to be used as a filter, and when thus employed any suitable filtering material may be used in place of the screens. The device may then be attached to the water-supply pipes of houses and stores in the manner before described, thus making a cheap and convenient filter.

The article herein described is cheap, convenient, easily and quickly attached and detached, and may be used both as a strainer and as a filter, and its construction is such that it may be easily taken apart for cleansing or for replacing old screens with new ones.

Having fully described the invention, what I claim as new, and desire to secure by Letters Patent, is—

1. A strainer comprising a pair of hollow, semispherical sections, each having an exteriorly-threaded rim and an axial threaded aperture, around which the metal is formed into a wrench-receiving hub; an inlet-nipple which is screwed into the hub of one section; an outlet-nipple which is screwed into the hub of the other section, and unions which connect the nipples with a water-supply pipe; a band having wrench-receiving holes in its outer periphery, and an interior annular abutment on each side of which the band is interiorly threaded to receive the threaded rims of the sections, and a pair of screens each of which is clamped between one of the sections and the wall of the abutment, substantially as shown.

2. A strainer comprising a band having an interior, annular abutment on each side of which the band is interiorly threaded; a pair of semispherical hollow sections, each of which has an exteriorly-threaded rim which is screwed into one of the threaded portions of the band, and an axial threaded hole around which the metal is formed into a wrench-receiving hub; an inlet-nipple which is screwed into the hub of one section; an outlet-nipple which is screwed into the hub of the other section, and unions for connecting the nipples with a water-supply pipe; a pair of screens of different mesh, each of which is clamped between one of the hollow sections and the annular abutment of the band, the coarser of said screens being at the inlet side of the strainer, and suitable washers against which the rims of the sections press to form a water-tight connection between the section and the band, substantially as shown.

3. A strainer comprising a pair of hollow semispherical sections, each of which is provided with an axial, threaded aperture, and with an exteriorly-threaded rim; a band having an interior, annular abutment, on each side of which the said band is interiorly threaded to receive the threaded rims of the hollow sections, and having spider-arms which extend across the opening in said band; a pair of screens of different mesh, each of which is clamped between one of the hollow sections and the annular abutment of the band; an inlet-nipple in the threaded hole of one section, and an outlet-nipple in the threaded hole of the other section and means for connecting the inlet and outlet nipples with a water-supply pipe, the coarser screen being next to the inlet, and being braced by the spider-arms to prevent bulging of the same under heavy water-pressure, substantially as shown.

4. A strainer comprising a pair of hollow semispherical sections, each having a threaded axial hole, around which the metal is formed into a wrench-receiving hub, and an exteriorly-threaded rim; a band for connecting the two sections, having an interior annular abutment, on each side of which the said band is interiorly threaded to receive the threaded rims of the hollow sections; recesses in one of the faces of the annular abutment and removable spider-arms whose ends are adapted to lie within the said recesses, a pair of screens of different mesh, each of which is clamped between one of the sections and the annular abutment of the band, the coarser of said screens being braced in one direction by the said spider-arms; a nipple which is screwed into the hub of one section and a corresponding nipple which is screwed into the hub of the other section and unions by which the nipples may be connected with a water-supply pipe, substantially as shown.

5. A strainer comprising a pair of hollow semispherical sections, each having an exteriorly-threaded rim, and a circular recess in the face of the rim; a band for connecting the two sections, having an interior, annular abutment, on each side of which the band is interiorly threaded to receive the threaded rims of the hollow sections; suitable washers which are interposed between the faces of the rims of the sections and the annular abutment of the band; a pair of screens of different mesh which lie in the circular recesses of the rims, an inlet in one section, and an outlet in the other section, and means for connecting the inlet and outlet with a water-supply pipe, substantially as shown.

6. A strainer comprising a pair of hollow, semispherical sections, each of which is provided with an exteriorly-threaded rim and with an axial threaded hole, the face of each of the said rims being provided with a circular depression which extends from its inner periphery to within a short distance of its outer threaded periphery, the said depression having an increasing depth toward its outer circumference; a band for connecting the hollow sections, having an interior annular abutment on each side of which the said band is interiorly threaded to receive the threaded rims of the sections, recesses in one face of the annular band, spider-arms, the ends of which fit within the said recesses; suitable washers which are interposed between the faces of the annular abutment and the ends of the sections; a coarse screen which lies in the circular depression of one of the sections and against the said spider-arms—and a screen of finer mesh which lies in the circular depression of the other section, the said screens being clamped against the washers by the edges formed by the inner circumference of the circular depression; nipples which screw into the threaded holes of the sections, and unions on the said nipple, substantially as shown.

7. A strainer comprising a pair of hollow, semispherical sections having threaded rims, the said rims being provided with counterbores, which increase in depth toward their outer circumferences; a threaded band for connecting the two sections, having an interior, annular abutment; washers which lie between the ends of the sections and the faces of the annular abutment; a coarse-mesh screen which lies in the counterbore of one of the sections; a screen of finer mesh which lies in the counterbore of the other section; the said screens being clamped against the washers by the edge formed by the inner circumference of the counterbores; an inlet-nipple in one of the sections, an outlet-nipple in the other section, and a faucet connected to the said inlet-nipple, substantially as shown.

8. In a strainer, the combination with a pair of hollow, semispherical sections which are connected by a threaded band having an interior annular abutment, with recesses in one of its faces, screens which lie within counterbores in the ends of said sections, an inlet in one section, and an outlet in the other section, of a removable spider, the ends of the arms of which lie within the recesses in the face of the annular abutment of the band, the said spider forming a brace for one of the screens, substantially as shown.

In testimony whereof I affix my signature in presence of two witnesses.

GUSTAVE A. W. SCHILLING.

Witnesses:
G. SARGENT ELLIOTT,
BESSIE THOMPSON.